United States Patent
Lin

(10) Patent No.: US 8,181,052 B2
(45) Date of Patent: May 15, 2012

(54) POWER SUPPLY CONTROL CIRCUIT

(75) Inventor: Ching-Chung Lin, Miao-Li (TW)

(73) Assignee: Chimei Innolux Corporaiton, Maio-Li County (TW)

( * ) Notice: Subject to any disclaimer, the term of this patent is extended or adjusted under 35 U.S.C. 154(b) by 480 days.

(21) Appl. No.: 12/454,453

(22) Filed: May 18, 2009

(65) Prior Publication Data

US 2009/0287946 A1 Nov. 19, 2009

(30) Foreign Application Priority Data

May 16, 2008 (CN) .......................... 2008 1 0067265

(51) Int. Cl.
*G06F 1/32* (2006.01)

(52) U.S. Cl. .................... 713/323; 713/320; 713/324

(58) Field of Classification Search .................. 713/300, 713/320, 323, 324
See application file for complete search history.

(56) References Cited

U.S. PATENT DOCUMENTS

| | | | |
|---|---|---|---|
| 5,138,543 A | 8/1992 | Harm et al. | |
| 6,107,698 A | 8/2000 | Ochiai et al. | |
| 6,496,390 B2 * | 12/2002 | Yang | 363/21.07 |
| 7,765,416 B2 * | 7/2010 | Zhou et al. | 713/320 |
| 2002/0190797 A1 * | 12/2002 | Deppe et al. | 330/297 |

FOREIGN PATENT DOCUMENTS

| | | |
|---|---|---|
| CN | 1248089 A | 3/2000 |
| CN | 2452222 Y | 10/2001 |

\* cited by examiner

*Primary Examiner* — Glenn A Auve
(74) *Attorney, Agent, or Firm* — Muncy, Geissler, Olds & Lowe, PLLC

(57) ABSTRACT

A power supply control circuit includes a standby control circuit, a microprocessor, and a power supply main circuit. The standby control circuit generates a pulse signal, outputs a first control signal, and sets the first control signal to an active state upon actuation of the switch member. The microprocessor outputs and sets a second control signal to first and second states upon first and second generations of the pulse signal, respectively. The standby control circuit maintains the first control signal at the active state when the second control signal is set to the first state, and sets the first control signal to an inactive state when the second control signal is set to the second state. The power supply main circuit outputs a power when the first control signal is set to the active state, and cuts off the power when the first control signal is set to the inactive state.

19 Claims, 8 Drawing Sheets

POWER SUPPLY CONTROL CIRCUIT

BACKGROUND

1. Technical Field

The present disclosure relates to power supplies, and more particularly to a power supply control circuit and a power supply control method using a standby control circuit to cut off power to a microprocessor.

2. Description of Related Art

Referring to FIG. 1, one example of a power supply control circuit 1 is employed in an electronic product (not shown) including a load circuit (not shown), to enable and disable the load circuit. The power supply control circuit 1 includes a first input port 2, a second input port 3, a relay 4, a first power supply circuit 5, a second power supply circuit 6, a microprocessor 7, and a switch 8. The relay includes a control member and a switch member. The second power supply circuit 6 includes a transformer 9 and a rectify-and-filter circuit 10.

The first power supply circuit 5 is coupled to the first input port 2 and the load circuit, as well as the second input port 3 through the switch member of the relay 4. The transformer 9 includes a primary coil having two ends coupled to the first and second input ports 2, 3, respectively, and a secondary coil coupled to the microprocessor 7 through the rectify-and-filter circuit 10. The microprocessor 7 is coupled to the control member of the relay 4 and the switch 8.

The first and second input ports 2, 3 are coupled to an external power source (not shown). The second power supply circuit 6 receives an alternating current (AC) voltage signal from the power source through the first and second input port 2, 3, converts the AC voltage signal to a first direct current (DC) voltage signal through the transformer 9 and the rectify-and-filter circuit 10, and outputs the first DC voltage signal to the microprocessor 7 so as to output a power thereto.

After the microprocessor 7 is powered on, pressing of the switch 8 to switch on the same generates a pulse signal. The microprocessor 7 receives the pulse signal and controls the control member of the relay 4 to turn on the switch member of the relay 4 in response to the pulse signal. Thereafter, the first power supply circuit 5 receives the AC voltage signal from the power source through the first and second input ports 2, 3, converts the AC voltage signal to a second DC voltage signal, and outputs the second DC voltage signal to the load circuit so as to output a power thereto.

After the first power supply circuit 5 is activated, a subsequent pressing of the switch 8 generates a second pulse signal. The microprocessor 7 receives the second pulse signal and controls the control member of the relay 4 to turn off the switch member of the relay 4 in response to the second pulse signal. Thereafter, the first power supply circuit 5 is cut off from receiving the AC voltage signal from the power source and stops conversion of the AC voltage into the second DC voltage signal so as to cut off the power thereto.

One disadvantage of the power supply control circuit 1 is that the second power supply circuit 6 continuously outputs the first DC voltage signal to the microprocessor 7 when the first power supply circuit 5 is activated or deactivated. Therefore, the transformer 9 of the second power supply circuit 6 is still at work when the first power supply circuit 5 is deactivated to cut off the power to the load circuit, which results in a power waste.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
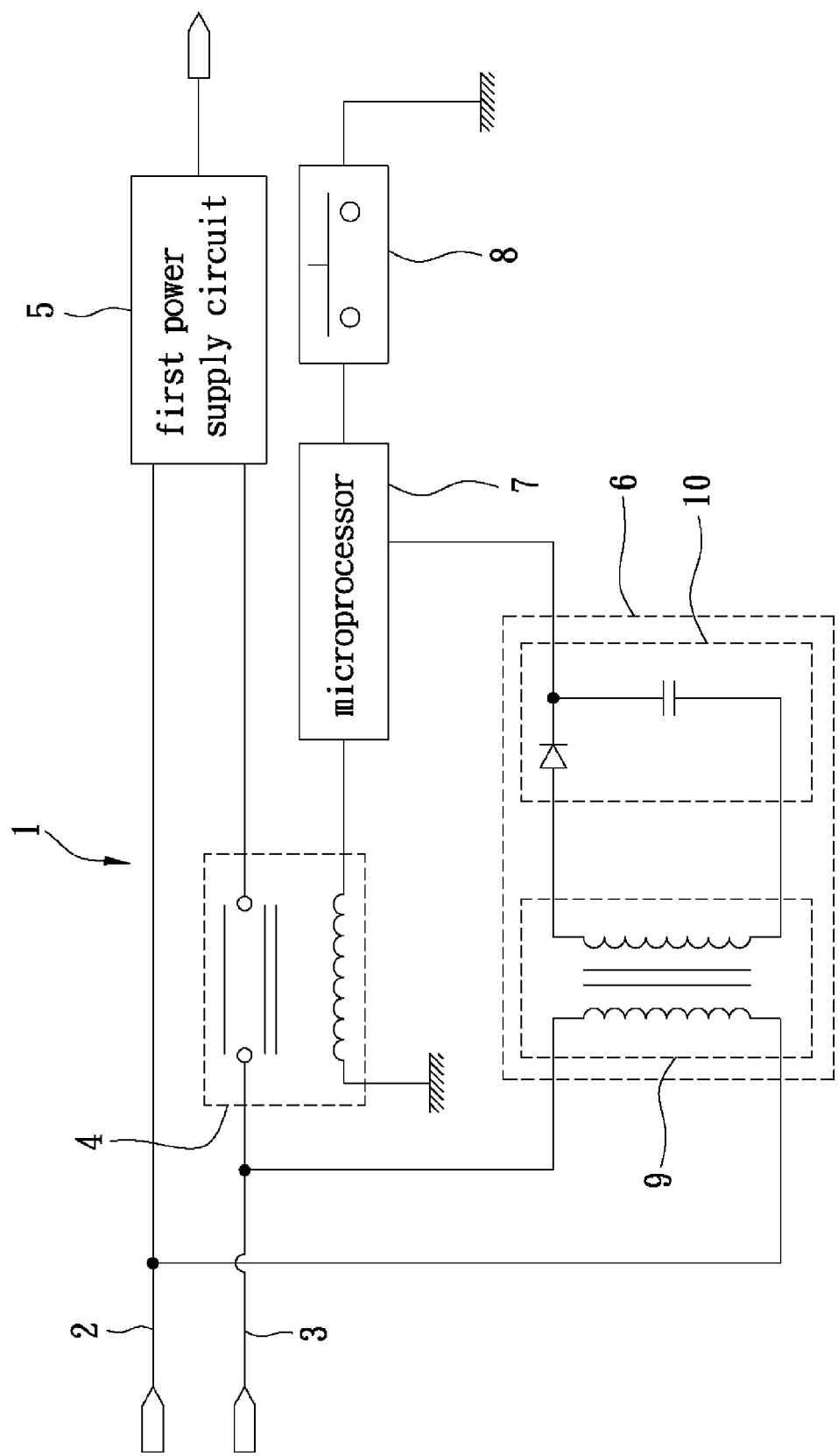
FIG. 1 is a circuit diagram of a power supply control circuit.
Figure 2:
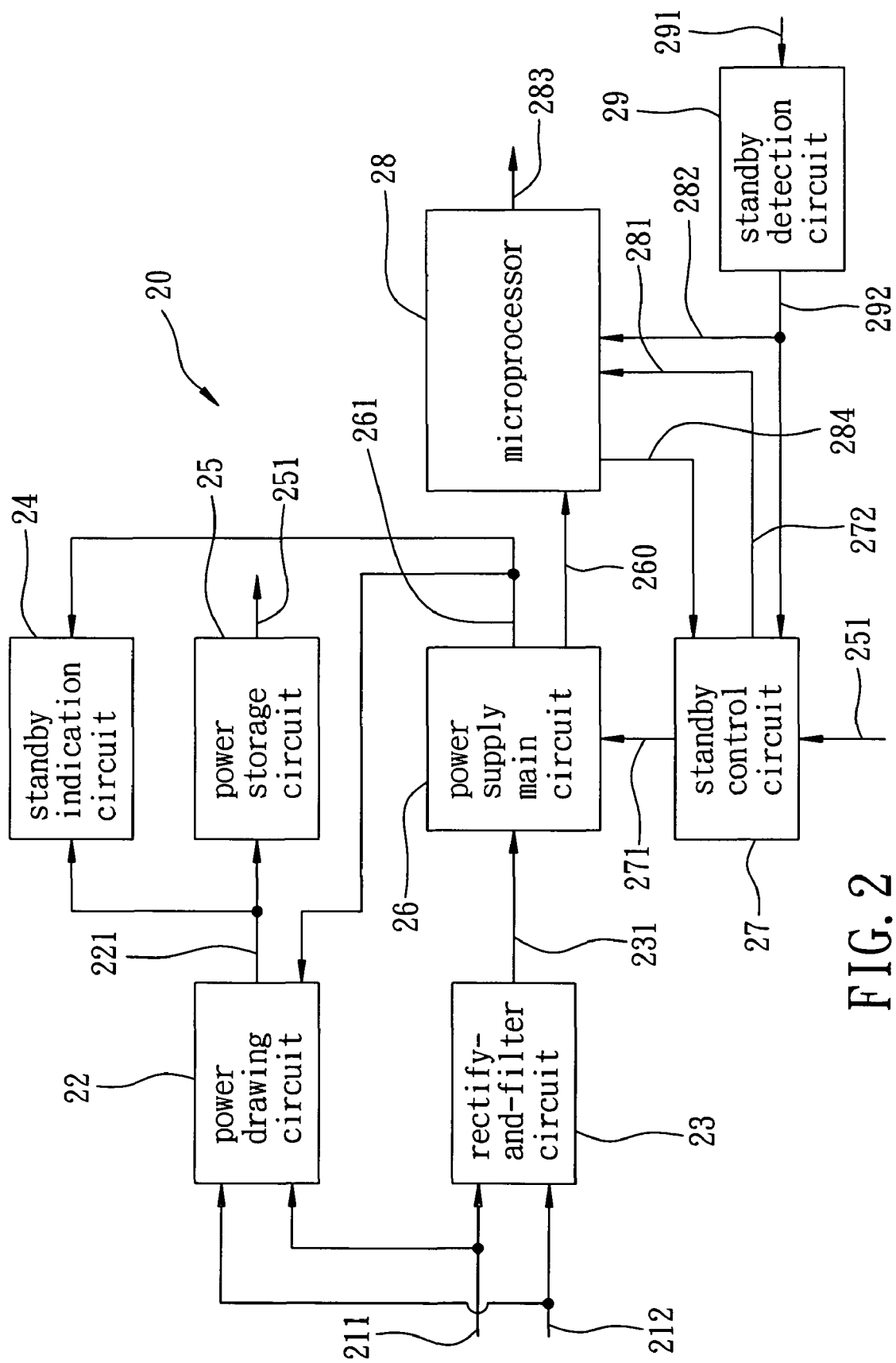
FIG. 2 is a block diagram of a power supply control circuit according to a first exemplary embodiment of the present disclosure, the power supply control circuit including a power supply main circuit, a power drawing circuit, and a power drawing circuit, and a standby indication circuit, and a standby control circuit.

Referring to FIG. 2, the first exemplary embodiment of a power supply control circuit 20 of the present disclosure is adapted to be employed in an electronic product (not shown) including a load circuit (not shown). The power supply control circuit 20 includes a first input port 211, a second input port 212, a power drawing circuit 22, a rectify-and-filter circuit 23, a standby indication circuit 24, a power storage circuit 25, a power supply main circuit 26, a standby control circuit 27, a microprocessor 28, and a standby detection circuit 29.

The first and second input ports 211, 212 are adapted to be coupled to a live line and a neutral line of a commercial power outlet, respectively (also referred hereinafter as an external power source). The rectify-and-filter circuit 23 includes an output terminal 231 coupled to the power supply main circuit 26, two inputs coupled to the first and second input ports 211, 212 respectively to receive an AC voltage signal from the commercial power outlet. The rectify and filter circuit is configured to rectify and filter the AC voltage signal to a first DC voltage signal, and to output the first DC voltage signal to the power supply main circuit 26 through the output terminal 231.

The power supply main circuit 26 includes a first output terminal 260 coupled to the microprocessor 28, and a second output terminal 261 coupled to the power drawing circuit 22 and the standby indication circuit 24. The power supply main circuit 26 is configured to receive the first DC voltage from the output terminal 231 of the power supply main circuit 26, to convert the first DC voltage signal to a second DC voltage signal (e.g. 5V) and a third DC voltage signal (e.g. 26V). The second DC voltage signal is outputted to the microprocessor 28 through the first output terminal 260 as a power to the microprocessor 28. The third DC voltage signal is outputted to the power drawing circuit 22 and the standby indication circuit 24 through the second output terminal 261 when a first control signal outputted from the standby control circuit 27 is set to an active state. The power supply main circuit 26 stops conversion of the first DC voltage signal into the second and third DC voltage signal when the first control signal is set to an inactive state so as to cut off the power to the microprocessor 28.

The power drawing circuit 22 includes an output terminal 221 coupled to the standby indication circuit 24 and the power storage circuit 25, and two inputs coupled to the first and second input port 211, 212 to receive the AC voltage signal from the commercial power outlet. The power drawing circuit 22 is configured to receive the third DC voltage signal from the second output terminal 262 of the power supply main circuit 26, and a voltage signal from a virtual ground 262 so as to draw a power therefrom and to output the power to the standby indication circuit 24 and the power storage circuit 25 through the output terminal 221.

The standby indication circuit 24 receives the third DC voltage signal from the second output terminal 262 to generate an indication signal in response to the third DC voltage signal. The indication signal indicates a working state of the power supply main circuit 26, i.e. whether the conversion of the first DC voltage signal into the second and third DC voltage signals is activated or deactivated.

The power storage circuit 25 includes an output terminal 25, is coupled to the standby control circuit 27, and is configured to receive the power from the output terminal 221 of the power drawing circuit 22, to store the power, and to output a power to the standby control circuit 27 through the output terminal 251.

Figure 6:
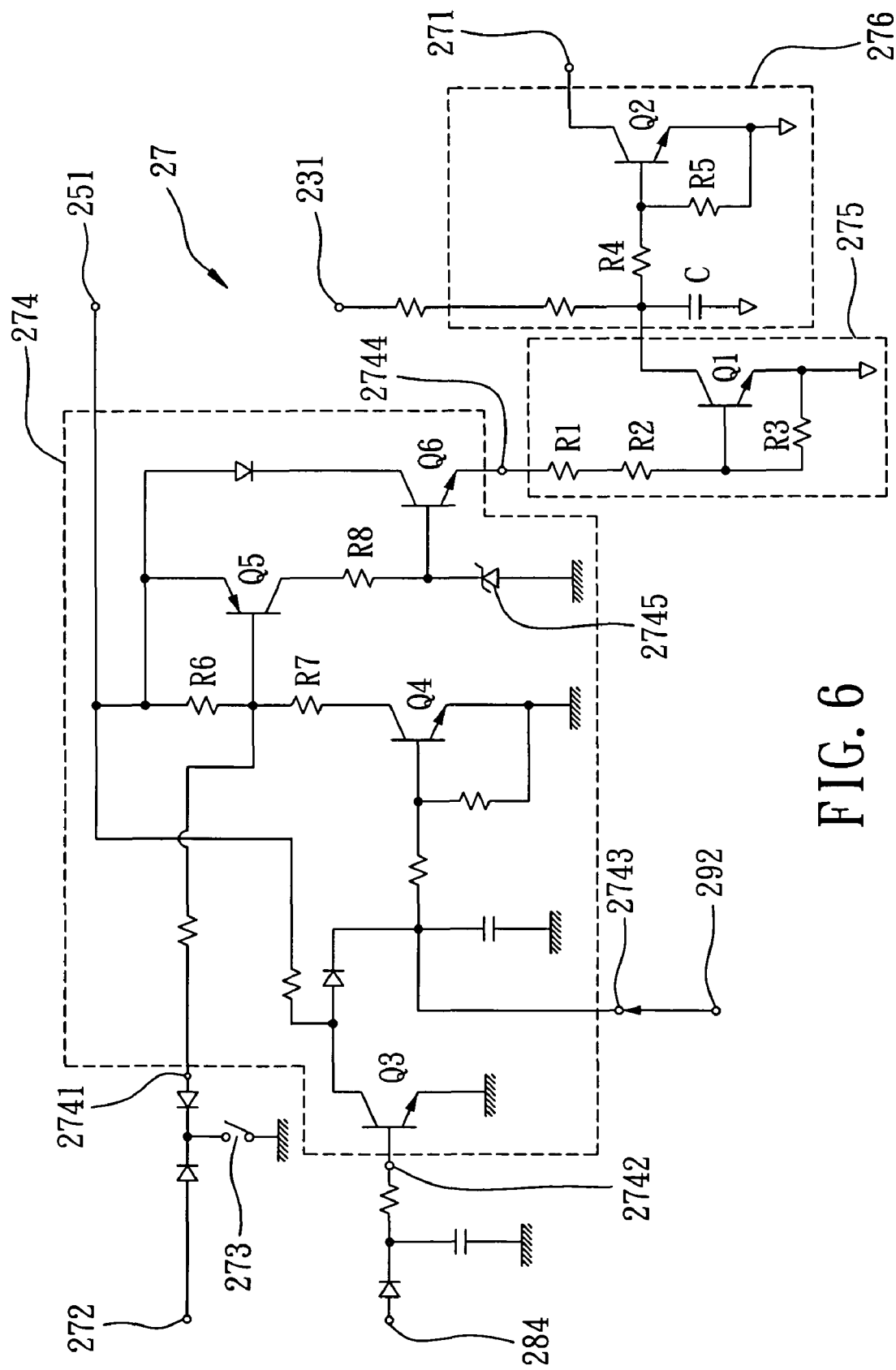
FIG. 6 is a circuit diagram of a standby control circuit of the first exemplary embodiment.

Referring to FIG. 6, the standby control circuit 27 includes a first output terminal 272 coupled to the microprocessor 28, a second output terminal 271 coupled to the power supply main circuit 26, and a switch member 273. The standby control circuit 27 is configured to generate a pulse signal upon actuation of the switch member 273, and to output the pulse signal to the microprocessor 28 through the first output terminal 272. The standby control circuit 27 is configured to output the first control signal to the power supply main circuit 26 through the second output terminal 271.

The microprocessor 28 includes a first trigger terminal 281, a second trigger terminal 282, a first output terminal 284, and a second output terminal 283 adapted to be coupled to the load circuit. The microprocessor 28 is configured to receive the pulse signal from the first output terminal 272 of the standby control circuit 27 through the first trigger terminal 281. The microprocessor 28 is also configured to output a second control signal to the standby control circuit 27 through the first output terminal 284. The microprocessor 28 is further configured to output a power signal to the load circuit through the second output terminal 283 so as to control operation of the load circuit.

The standby detection circuit 29 includes an input terminal 291 adapted to be coupled to the load circuit, and an output terminal 292 coupled to the microprocessor 28 and the standby control circuit 27. The standby detection circuit 29 is configured to detect the load circuit through the input terminal 291 so as to determine whether the load circuit is in an operation mode or a standby mode. The standby detection circuit 29 outputs a third control signal to the second trigger terminal 282 of the microprocessor 28 and the standby control circuit 27 through the output terminal 292. The standby detection circuit 29 is configured to set the third control signal to an operation state when the load circuit is in the operation mode and to a standby state when the load circuit is in the standby mode.

When the load circuit is a liquid crystal panel of a liquid crystal display (LCD), the standby detection circuit 29 can be configured to detect a voltage signal of the liquid crystal panel such as a digital visual interface (DVI) signal, a video graphics array (VGA) signal, or a high definition multimedia interface (HDMI) signal. When the standby detection circuit 29 detects the existence of the voltage signal of the liquid crystal panel, i.e., the liquid crystal panel is in the operation mode, it delivers the voltage signal to the output terminal 292 and thereby set the third control signal to the operation mode. On the other hand, when the standby detection circuit 29 does not detects the existence of the voltage signal of the liquid crystal panel, i.e., the liquid crystal panel is in the standby mode, it stops delivering the voltage signal to the output terminal 292 and thereby set the third control signal to the standby mode.

The microprocessor 28 is configured to set the second control signal to a first state upon a first generation of the pulse signal, to a second state upon a second generation of the pulse signal. The second control signal is set to the first state when the third control signal is set to the operation state, and to the second state when the third control signal is set to the standby state.

The standby control circuit 27 is configured to set the first control signal to the active state upon actuation of the switch member 273, so as to maintain the first control signal at the active state when the second control signal is set to the first state. The standby control circuit 27 is also configured to set the first control signal to the inactive state when the second control signal is set to the second state, so as to set the first control signal to the active state when the third control signal is set to the operation state.

Figure 3:
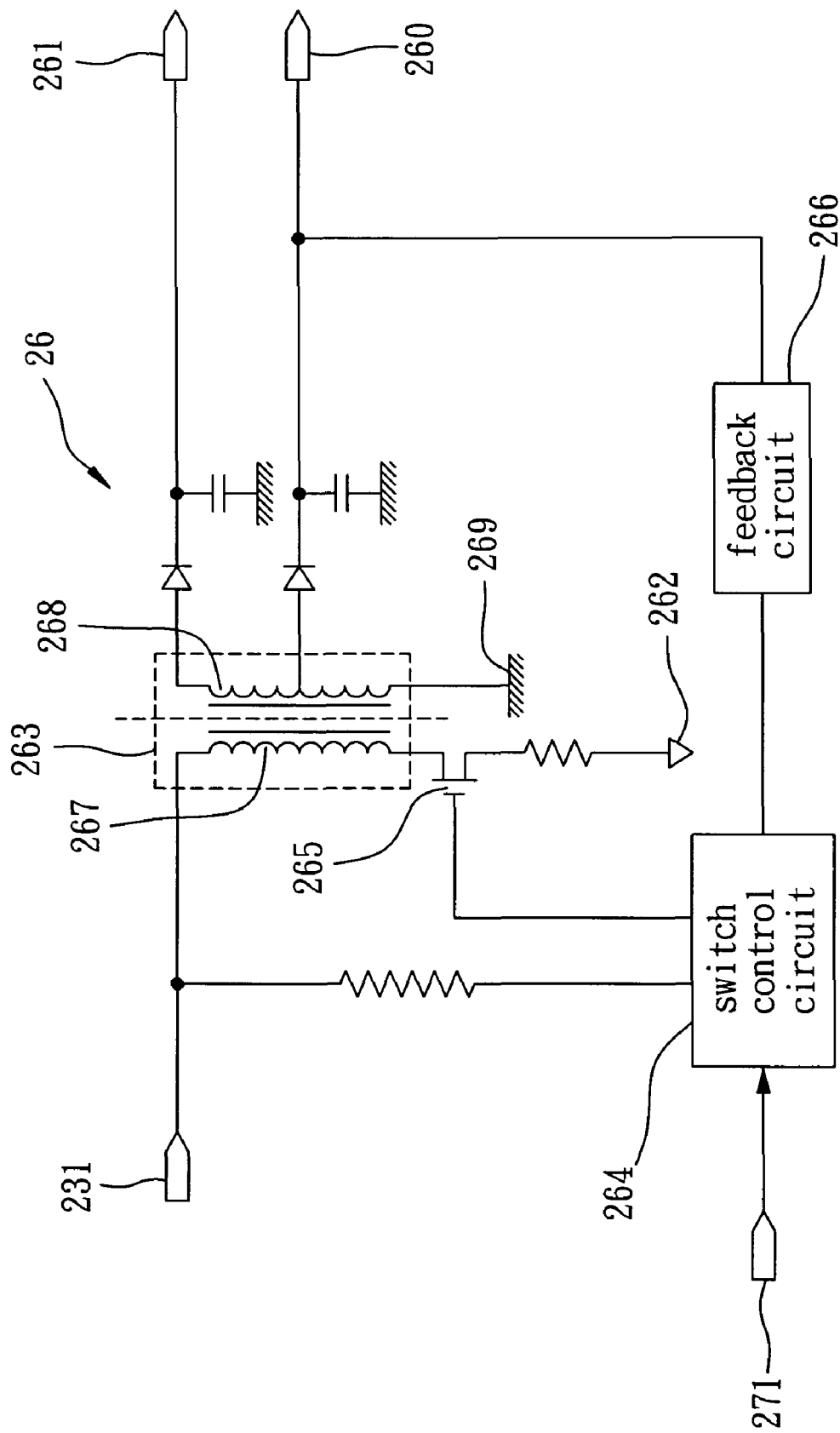
FIG. 3 is a circuit diagram of the power supply main circuit of the first exemplary embodiment.

Referring to FIGS. 2, 3, the power supply main circuit 26 includes a transformer 263, a switch control circuit 264, a virtual ground 262, a real ground 269, a transistor 265 coupled to the virtual ground 262, and a feedback circuit 266. The transformer 263 includes a primary coil 267 and a secondary coil 268.

The primary coil 267 has a first end coupled to the output terminal 231 of the rectify-and-filter circuit 23 and configured to receive the first DC voltage from the output terminal 231 of the rectify-and-filter circuit 23 and a second end coupled to the virtual ground 262 through the transistor 265 and a resistor (not labeled). The secondary coil 268 has a first end coupled to the second output terminal 261 through a rectify-and-filter circuit (not labeled), a middle node coupled to the first output terminal 260 through another rectify-and-filter circuit (not labeled), and a second end coupled to the real ground 269. As such, the first DC voltage signal can be converted to two different voltage signals, i.e. the second DC voltage signal on the first output terminal 260 and the third DC voltage signal on the second output terminal 261.

The feedback circuit 266 is coupled to the first output terminal 260, and is configured to receive the second DC voltage signal therefrom and to output a feedback signal in response to the second DC voltage signal.

The switch control circuit 264 is coupled to the second output terminal 271 of the standby control circuit 27, the output terminal 231 of the rectify-and-filter circuit 23 through another resistor (not labeled), the feedback circuit 266, and a gate electrode of the transistor 265. The switch control circuit 264 is also configured to receive the first control signal from the second output terminal 271 of the standby control circuit 27 and the feedback signal form the feedback circuit 266, and to draw a power from the output terminal 231 of the rectify-and-filter circuit 23. The switch control circuit 264 is further configured to turn the transistor 265 on and off alternately so as to convert the first DC voltage to the second DC voltage signal and the third DC voltage signal, and to turn the transistor 265 off so as to stop conversion of the first DC voltage to the second DC voltage signal and the third DC voltage signal when the first control signal is set to the inactive state.

A control the duty ratio of the transistor 265 is adjusted by the switch control circuit 264 in response to the feedback signal when the first control signal is set to the active state.

It is noted that the voltage signal provided by the virtual ground 262 can have a zero or a non-zero potential, while a voltage signal provided by the real ground 269 has a zero potential. It is noted that, "virtually grounded" is referred hereinafter to a situation in which an element is coupled to the virtual ground 262, and "grounded" is referred hereinafter to a situation in which an element is coupled to the real ground 269.

Figure 4:
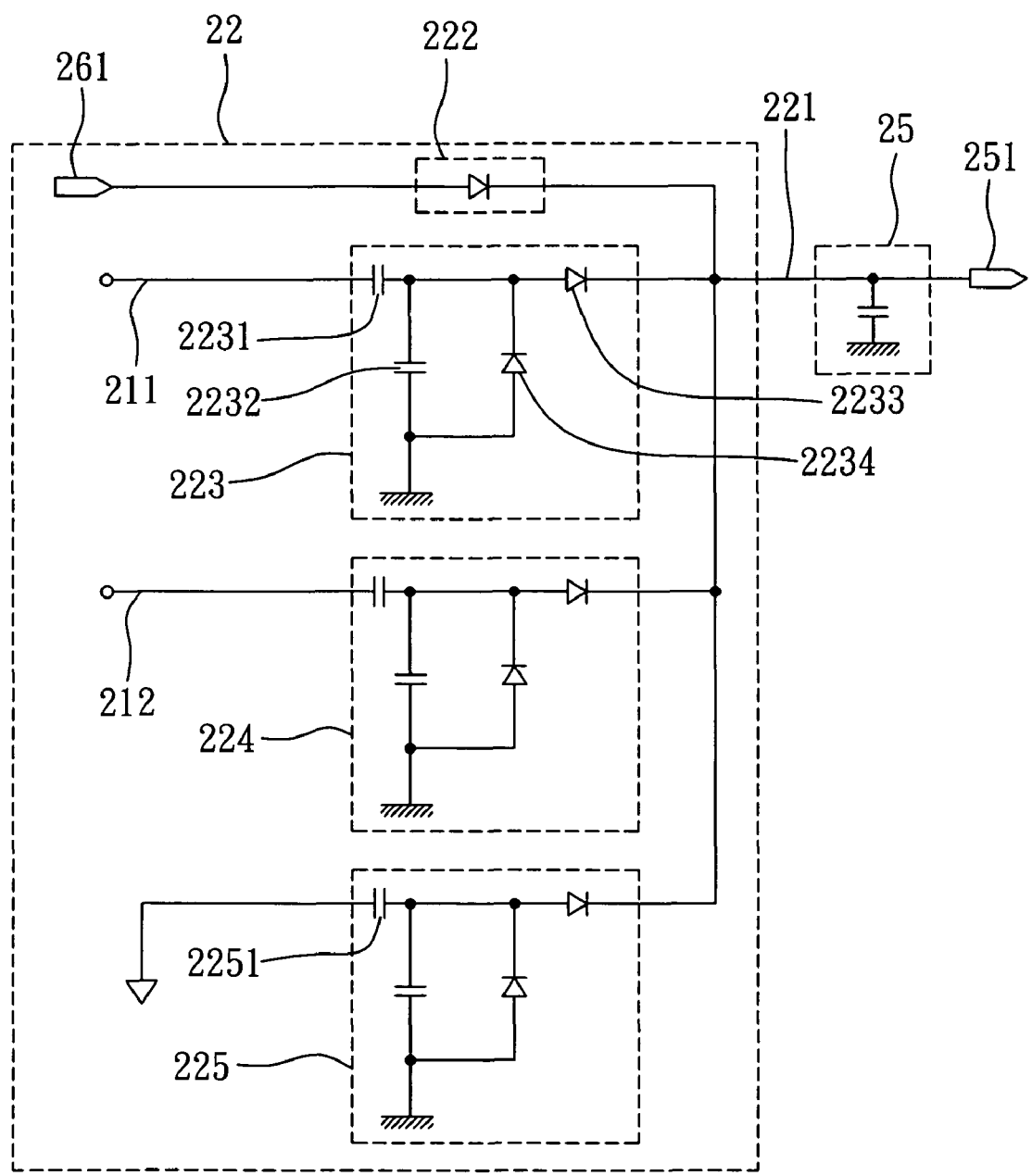
FIG. 4 is a circuit diagram of the power drawing circuit of the first exemplary embodiment.

Referring to FIGS. 2, 4, the power storage circuit 25 includes a capacitor (not labeled) having a first end grounded and a second end coupled to the output terminal 221 of the power drawing circuit 22 and the output terminal 251 of the power storage circuit 25. The power drawing circuit 22 includes a first drawing circuit 222, a second drawing circuit 223, a third drawing circuit 224, and a fourth drawing circuit 225.

The first drawing circuit 222 includes a diode (not labeled) having an anode coupled to the second output terminal 261 of the power supply main circuit 26 and configured to receive the third DC voltage signal therefrom, and a cathode coupled to the output terminal 221 of the power drawing circuit 22.

The second drawing circuit 223 includes a first capacitor 2231, a second capacitor 2232, a first diode 2233 and a second diode 2234. The first diode 2233 includes an anode coupled to the first input port 211 through the first capacitor 2231, and a cathode coupled to the output terminal 221 of the power drawing circuit 22. The second diode 2234 includes an anode that is grounded, and a cathode coupled to the anode of the first diode 2233. The second capacitor 2232 is coupled to the second diode 2234 in parallel.

The structure of the third drawing circuit 224 differs from the second drawing circuit 223 in that the third drawing circuit 224 is coupled to the second input port 212 instead. The structure of the fourth drawing circuit 225 differs from the second drawing circuit 223 except that the fourth drawing circuit 225 is virtually grounded instead. Alternatively, the first capacitor 2251 of the fourth drawing circuit 225 can be replaced by a resistor or an inductor.

As such, the power drawing circuit draws the power from the second output terminal 261 of the power supply main circuit 26 through the first drawing circuit 222, from the commercial power outlet through the second and third drawing circuits 223, 224, and from the virtual ground through the fourth drawing circuit 225.

The power drawing circuit 22 draws the power from the power supply main circuit 26, the commercial power outlet, and the virtual ground 262 at the same time when the power supply main circuit 26 is activated, and the power from the commercial power outlet and the virtual ground 262 when the power supply main circuit 26 is deactivated.

Figure 5:
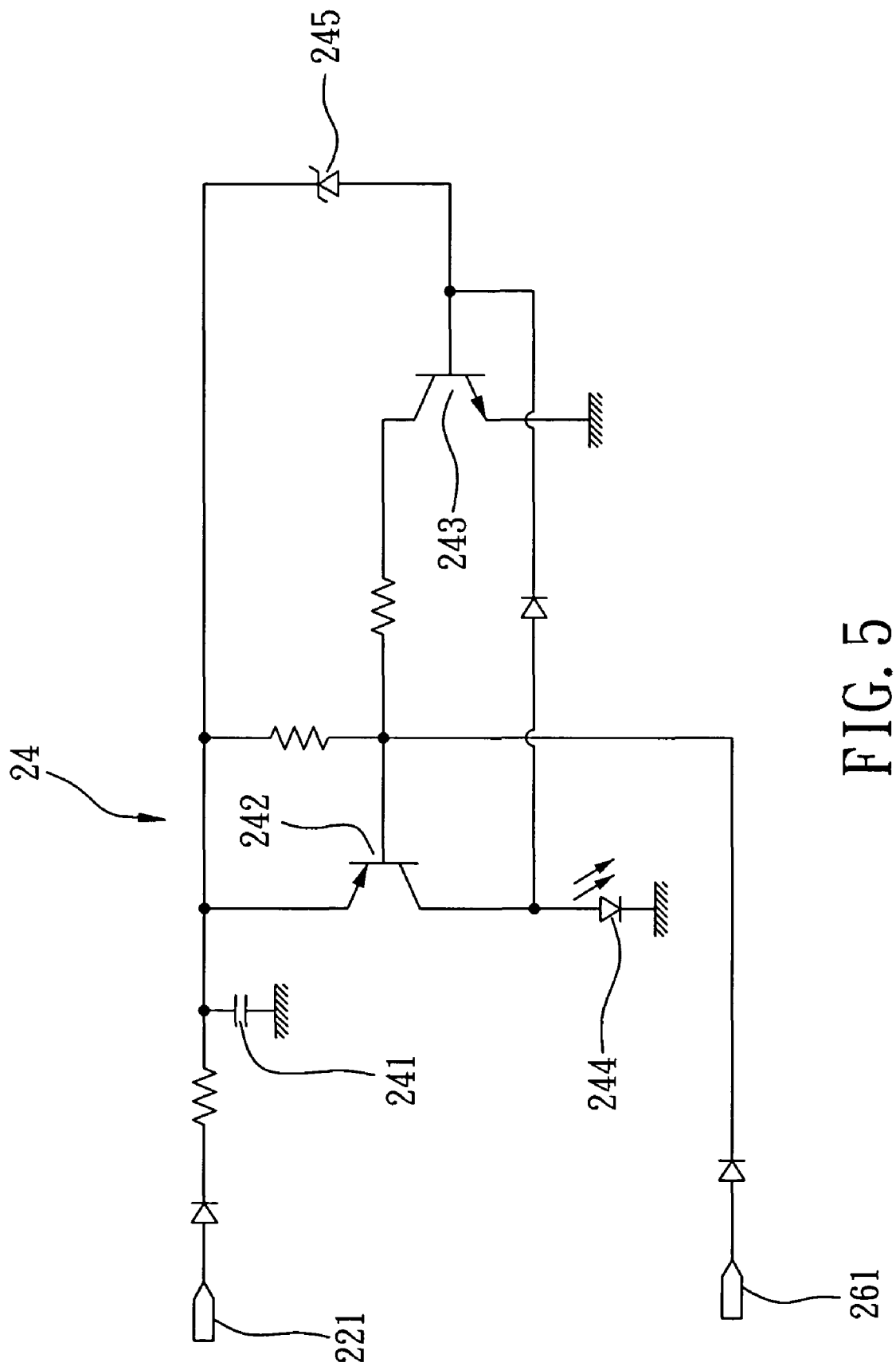
FIG. 5 is a circuit diagram of the standby indication circuit of the first exemplary embodiment.

Referring to FIG. 2 and FIG. 5, the standby control circuit 24 includes a capacitor 241, a first transistor 242, a second transistor 243, a light emitting diode (LED) 244, and a Zener diode 245. The first transistor 242 is a PNP bipolar junction transistor (BJT), and the second transistor 243 is an pnp BJT as well.

The first transistor 242 includes an emitter electrode coupled to the output terminal 221 of the power drawing circuit 22 through a resistor (not labeled) and a diode (not labeled) and grounded through the capacitor 241, a collector electrode grounded through the LED 244, and a base electrode coupled to the emitter electrode through a resistor (not labeled) and to the second output terminal 261 of the power supply main circuit 26 through a diode (not labeled). The second transistor 243 includes an emitter diode that is grounded, a collector electrode coupled to the base electrode of the first transistor 242 through a resistor (not labeled), and a base electrode coupled to the emitter electrode of the first transistor 242 and to the collector electrode of the first transistor 242 through a diode (not labeled).

When the power supply main circuit 26 is activated, the power supply main circuit 26 outputs the third DC voltage signal to the base electrode of the first transistor 242. This deactivates the first transistor 242, and turns off the LED 244.

When the power supply main circuit 26 is deactivated, the power supply main circuit 26 stops outputting the third DC voltage signal. Meanwhile, the power drawing circuit 22 charges the capacitor 241. When a voltage of capacitor 241 is charged to a level sufficient to make the Zener diode 245 breakdown, the second transistor 243 is turned on so as to pull the voltage on the base electrode of the first transistor 242 to a low potential. This turns on the first transistor 242 and thereby permits discharging of the capacitor 241 through the LED 244 so as to turn on the LED 244. When the voltage of the capacitor 241 is discharged to a level sufficient to turn off the second transistor 243, the first transistor 243 is turned off as well. This turns off the LED. The capacitor 241 is charged and discharged alternately when the power supply main circuit 26 is deactivated. As a consequence, the LED flashes intermittently, which serves as a signal indicatings that the power supply main circuit 26 is deactivated.

Referring to FIG. 2 and FIG. 6, the standby control circuit 27 further includes a flip-flop 274, an electronic switch 275, and an inverter 276. The switch member 273 is off normally, and is turned on when actuated, for example through a pressing action manually. The electronic switch 275 is off normally.

The switch member 273 includes a first end that is grounded, and a second end coupled to the first output terminal 272 of the standby control circuit 27 through a diode (not labeled).

The flip-flop 274 includes a first input terminal 2471 coupled to the second terminal of the switch member 273 through a diode (not labeled), a second input terminal 2472 coupled to the first output terminal 284 of the microprocessor 28 through a resistor and a diode (not labeled) and grounded through the resistor and a capacitor, a third input terminal 2473 coupled to the output terminal 292 of the standby detection circuit 29, and an output terminal 2474.

The electronic switch 275 includes a first resistor (R1), a second resistor (R2), a third resistor (R3), and a first transistor (Q1). The first transistor (Q1) includes a base electrode coupled to the output terminal 2744 of the flip-flop 274 through the second resistor (R2) and the first resistor (R1) and virtually grounded through the third resistor (R3), an emitter electrode that is grounded, and a collector electrode. The first transistor (Q1) is an npn BJT or an n-channel metal-oxide semiconductor field-effect transistor (MOSFET).

The inverter 276 includes a second transistor (Q2), a capacitor (C), a fourth resistor (R4), and a fifth resistor (R5). The second transistor (Q2) includes a base electrode virtually grounded through the fifth resistor (R5) and through the fourth resistor (R4) and the capacitor (C) and coupled to the collector electrode of the first transistor (Q1) through the fourth resistor (R4) and to the output terminal 231 of the rectify-and-filter circuit 23 through two resistors (not labeled), and a collector electrode coupled to the second output terminal 271 of the standby control circuit 27. The second transistor (Q2) is an npn BJT or an n-channel MOSFET.

The flip-flop 274 further includes a third transistor (Q3), a fourth transistor (Q4), a fifth transistor (Q5), a sixth transistor (Q6), a Zener diode 2745, a sixth resistor (R6), a seventh resistor (R7), and an eighth resistor (R8). The third transistor (Q3), the fourth transistor (Q4), and the sixth transistor (Q6) are npn BJTs or n-channel MOSFETs, and the fifth transistor (Q5) is a pnp BJT or a p-channel MOSFET.

The third transistor (Q3) includes a base electrode coupled to the second input signal 2742, an emitter electrode that is grounded, and a collector electrode coupled to the output terminal 251 of the power storage circuit 25 through a resistor (not labeled) and to the third input terminal 2743 of the flip-flop 274 through a diode (not labeled). The third input terminal 2743 of the flip-flop 274 is grounded through a capacitor (not labeled). The fourth transistor (Q4) includes a base electrode coupled to the third input terminal 2743 of the flip-flop 274 through a resistor (not labeled) and grounded through another resistor (not labeled), an emitter electrode that is grounded, and a collector electrode. The fifth transistor (Q5) includes a base electrode coupled to the first input terminal 2741 of the flip-flop 274 through a resistor (not labeled), to the output terminal 251 of the power storage circuit 25 through the sixth resistor (R6), and to the collector of the fourth transistor (Q4) through the seventh resistor (R7), an emitter electrode coupled to the output terminal 251 of the power storage circuit 25, and a collector electrode. The sixth transistor (Q6) includes a base electrode coupled to the collector electrode of the fifth transistor (Q5) through the eighth resistor (R8) and grounded through the Zener diode 2745, an emitter electrode coupled to the output terminal 2744 of the flip-flop 274, and a collector electrode coupled to the output terminal 251 of the power storage circuit 25 through a diode (not labeled).

When the switch member 273 is actuated, the pulse signal is generated on the first output terminal 272 of the standby control circuit 27, the base electrode of the fifth transistor (Q5) is pulled down to a low potential sufficient to turn on the fifth transistor (Q5), the base electrode of the sixth transistor (Q6) is pulled up to a high potential sufficient to turn on the sixth transistor (Q6), the base electrode of the first transistor (Q1) is pulled up to a high potential sufficient to turn on the first transistor (Q1), and the base electrode of the second transistor (Q2) is pulled down to a low potential sufficient to turn off the second transistor (Q2). As such, the electrical potential of the second output terminal 271 of the standby control circuit 27 is not pulled down to a low potential level when the switch member 273 is actuated, i.e. the first control signal is set to the active state.

When the first output terminal 284 of the processor 28 is pulled down to a low potential, i.e. the second control signal is set to the first state, the base electrode of the third transistor (Q3) is pulled down to a low potential sufficient to turn off the third transistor (Q3), and the base electrode of the fourth transistor (Q4) is pulled up to a high potential sufficient to turn on the fourth transistor (Q4). As such, the base electrode of the fifth transistor (Q5) is maintained at the low potential and the electrical potential of the second output terminal 271 of the standby control circuit 27 is not pulled down to a low potential level, i.e. the first control signal is maintained at the active state.

When the first output terminal 284 of the processor 28 is pulled up to a high potential, i.e. the second control signal is set to the second state, the base electrode of the third transistor (Q3) is pulled up to a high potential sufficient to turn on the third transistor (Q3). Thus the base electrode of the fourth transistor (Q4) is pulled down to a low potential sufficient to turn off the fourth transistor (Q4), and the base electrode of the fifth transistor (Q5) is pulled up to a high potential sufficient to turn off the fifth transistor (Q5). Then the base electrode of the sixth transistor (Q6) is pulled down to a low potential sufficient to turn off the sixth transistor (Q6), and the base electrode of the first transistor (Q1) is pulled down to a low potential sufficient to turn off the first transistor (Q1). As a result, the base electrode of the second transistor (Q2) is pulled up to a high potential sufficient to turn on the second transistor (Q2). As such, the electrical potential of the second output terminal 271 of the standby control circuit 27 is pulled down to a low potential level, i.e. the first control signal is set to the inactive state.

When the output terminal 292 of the standby detection circuit 29 is pulled up to a high potential, i.e. the third control signal is set to the operation state, the base electrode of the fourth transistor (Q4) is pulled up to a high potential sufficient to turn on the fourth transistor (Q4). As such, the base electrode of the fifth transistor (Q5) is pulled down to the low potential and the electrical potential of the second output terminal 271 of the standby control circuit 27 is not pulled down to a low potential level, i.e. the first control signal is set to the active state.

Referring to FIG. 2 to FIG. 6, details of the operation of the power supply control signal are as follows.

When the standby control circuit 27 is powered, the standby control circuit 27 generates a pulse signal upon actuation of the switch member 273, outputs the pulse signal to the microprocessor 28 and the first control signal to the power supply main circuit 26, and sets the first control signal to the active state upon actuation of the switch member 273. The power supply main circuit 26 outputs a power to the microprocessor 28 when the first control signal is set to the active state. The microprocessor 28 outputs the second control signal to the standby control circuit 27 and sets the second control signal to the first state upon first generation of the pulse signal. The standby control circuit 27 maintains the first control signal at the active state when the second control signal is set to the first state.

At this time, when the switch member 273 is reactuated, the standby control circuit 27 generates a second pulse signal and outputs the second pulse signal to the microprocessor 28. The microprocessor 28 sets the second control signal to the second state upon generation of the second pulse signal. The standby control circuit 27 sets the first control signal to the inactive state when the second control signal is set to the second state. The power supply main circuit 26 cuts off the power to the microprocessor 28 when the first control signal is set to the inactive state.

When the standby control circuit 27 and the microprocessor 28 are powered on and when the load circuit is in the standby mode, the standby detection circuit 29 outputs a third control signal to the standby control circuit 27 and the microprocessor 28 and sets the third control signal to the standby state. The microprocessor 28 sets the second control signal to the second state when the third control signal is set to the standby state. This sets the first control signal of the standby control circuit 27 to the inactive state. The power supply main circuit 26 cuts off the power to the microprocessor 28 when the first control signal is set to the inactive state.

When the standby control circuit 27 is powered on and the microprocessor 28 is not powered on and the load circuit is in the operation mode, the standby detection circuit 29 sets the third control signal to an operation state. The standby control circuit 27 sets the first control signal to the active state when the third control signal is set to the operation state. This enables the power supply main circuit 26 to output the power to the microprocessor 28 and sets the second control signal of the microprocessor 28 to the first state so as to maintain the first control signal of the standby control circuit 27 at the active state.

With the inclusion of the standby control circuit 27 in the power supply control circuit of the disclosure, the power supply circuit 26 which outputs the power to the microprocessor 28 can be deactivated, thereby resulting in a power saving.

Figure 7:
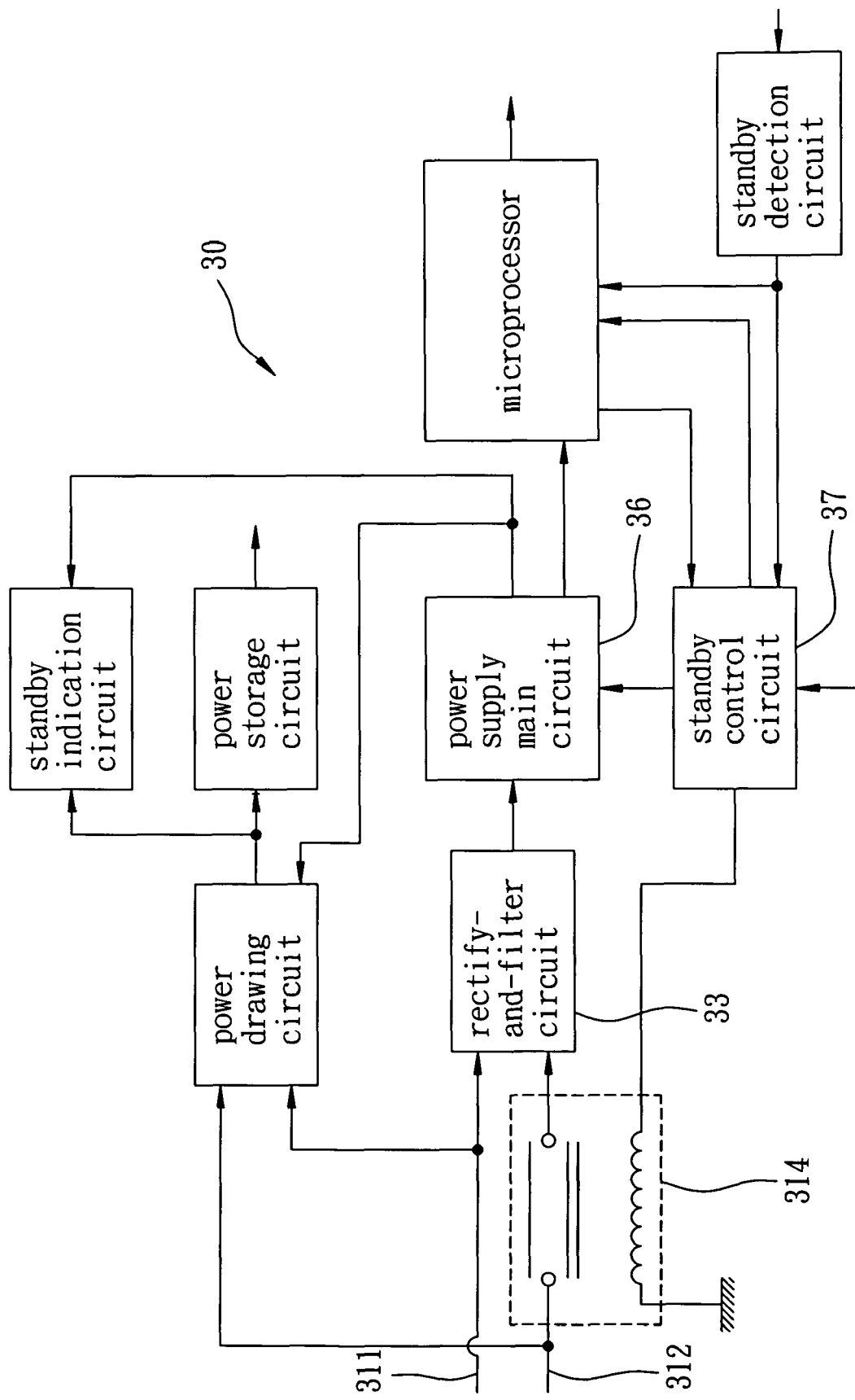
FIG. 7 is a circuit diagram of a power supply control circuit according to a second exemplary embodiment of the present disclosure.

Referring to FIG. 7, the second exemplary embodiment of a power supply control circuit of the present disclosure differs from the first exemplary embodiment in that the power supply control circuit 30 further includes a relay 314. In this embodiment, the relay 314 is coupled between the second input port 312 and the rectify-and-filter circuit 33. The standby control circuit 37 is further coupled to the relay 314, and is configured to turn on the relay 314 when the first control signal is set to the active state and to turn off the relay 314 when the first control signal is set to the inactive state so as to save more power.

Figure 8:
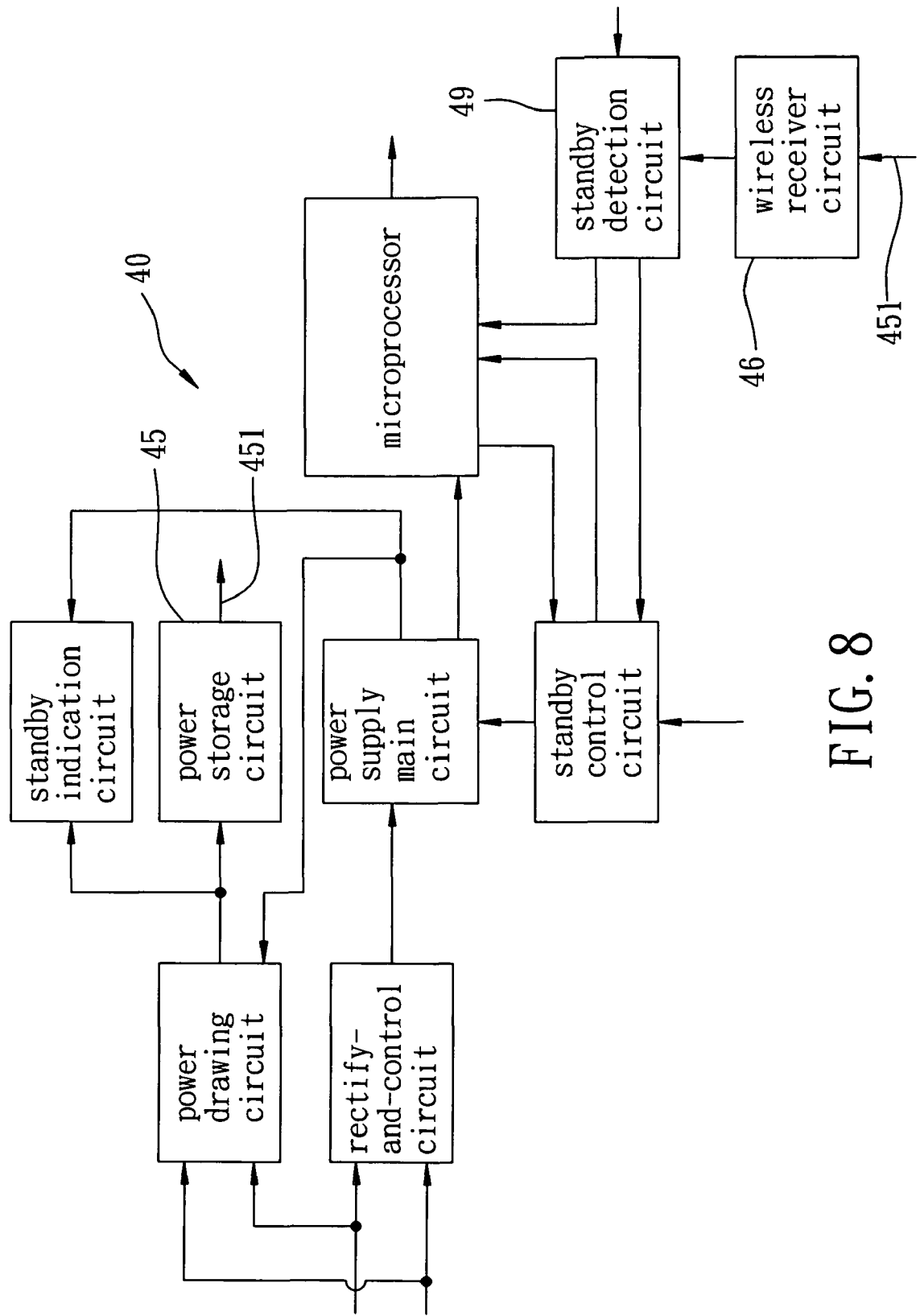
FIG. 8 is a block diagram of a power supply control circuit according to a third exemplary embodiment of the present disclosure.

Referring to FIG. 8, the third exemplary embodiment of a power supply control circuit of the present disclosure differs from the first exemplary embodiment in that the power supply control circuit 40 further includes a wireless receiver circuit 46. In this embodiment, the wireless receiver circuit 46 is configured to receive a remote command (remote ok? OK). The standby control circuit 37 is further coupled to the wireless receiver circuit 46, and is configured to set the third control signal to a selected one of the operation state and the standby state. The power storage circuit 45 is further coupled to the wireless receiver circuit 46, and is configured to output a power thereto.

It is to be, further, understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

The invention claimed is:

1. A power supply control circuit, comprising:
a standby control circuit comprising a switch member, a flip-flop, an electronic switch coupled to the flip-flop and is off normally, and an inverter coupled to the electronic switch, the standby control circuit being configured to generate a pulse signal upon actuation of the switch member and output a first control signal,
a microprocessor coupled to the standby control circuit and configured to receive the pulse signal, to output a second control signal, and to set the second control signal to a first state upon a first generation of the pulse signal and to a second state upon a second generation of the pulse signal, the standby control circuit being further configured to receive the second control signal, to maintain the first control signal at the active state when the second control signal is set to the first state, and to set the first control signal to an inactive state when the second control signal is set to the second state, and wherein the flip-flop configured to activate the electronic switch upon actuation of the switch member, to maintain the electronic switch in the activated state when the second control signal is set to the first state, and to deactivate the electronic switch when the second control signal is set to the second state, the inverter configured to set the first control signal to the active state when the electronic switch is activated and to the inactive state when the electronic switch is deactivated; and
a power supply main circuit coupled to the microprocessor and the standby control circuit and configured to receive the first control signal, to output a power to the microprocessor when the first control signal is set to the active state, and to cut off the power to the microprocessor when the first control signal is set to the inactive state.

2. The power supply control circuit of claim 1, further comprising a standby detection circuit coupled to the standby control circuit and the microprocessor, adapted to be coupled to an external load circuit, and configured to output a third control signal and to set the third control signal to an operation state when the load circuit is in an operation mode and to a standby state when the load circuit is in a standby mode, the standby control circuit being further configured to set the first control signal to the active state when the third control signal is set to the operation state, the microprocessor being further configured to set the second control signal to the first state when the third control signal is set to the operation state and to the second state when the third control signal is set to the standby state.

3. The power supply control circuit of claim 2, further comprising a wireless receiver circuit coupled to the standby detection circuit and configured to receive a remote command from an external remote controller, the standby detection circuit being further configured to set the third control signal to a selected one of the operation state and the standby state in response to the remote command.

4. The power supply control circuit of claim 1, further comprising a rectify-and-filter circuit coupled to the power supply main circuit, adapted to be coupled to an external power source, and configured to receive an AC voltage signal from the power source and to convert the AC voltage signal to a first DC voltage signal, the power supply main circuit being configured to receive the first DC voltage signal, to convert the first DC voltage signal to a second DC voltage signal and output the second DC voltage signal to the microprocessor when the first control signal is set to the active state, and to stop conversion of the first DC voltage signal into the second DC voltage signal when the first control signal is set to the inactive state.

5. The power supply control circuit of claim 4, further comprising a power storage circuit coupled to the standby control circuit and configured to output a power to the standby control circuit.

6. The power supply control circuit of claim 5, wherein the power supply main circuit is further configured to convert the first DC voltage signal to a third DC voltage signal when the first control signal is set to the active state, and to stop conversion of the first DC voltage signal into the third DC voltage signal when the first control signal is set to the inactive state.

7. The power supply control circuit of claim 6, further comprising a power drawing circuit coupled to the power supply main circuit and the power storage circuit, adapted to be coupled to the power source, and configured to receive the third DC voltage signal from the power supply main circuit and the AC voltage signal from the power source so as to draw a power therefrom and to output the power to the power storage circuit.

8. The power supply control circuit of claim 7, wherein the power drawing circuit includes a first drawing circuit, the first drawing circuit including a diode that has an anode configured to receive the third DC voltage and a cathode coupled to the power storage circuit.

9. The power supply control circuit of claim 8, wherein the power drawing circuit further includes a second drawing circuit, the second drawing circuit including a first capacitor, a second capacitor, a first diode and a second diode, the first diode having an anode adapted to be coupled to a live line of the power source through the first capacitor, and a cathode coupled to the power storage circuit, the second diode having an anode that is grounded and a cathode coupled to the anode of the first diode, the second capacitor being coupled to the second diode in parallel.

10. The power supply control circuit of claim 8, wherein the power drawing circuit further includes a third drawing circuit, the third drawing circuit including a first capacitor, a second capacitor, a first diode and a second diode, the first diode having an anode adapted to be coupled to a neutral line of the power source through the first capacitor, and a cathode coupled to the power storage circuit, the second diode having an anode that is grounded and a cathode coupled to the anode of the first diode, the second capacitor being coupled to the second diode in parallel.

11. The power supply control circuit of claim 7, wherein the rectify-and-filter circuit includes a switch control circuit, a virtual ground, a transistor coupled to the virtual ground, and a transformer that includes a primary coil and a second coil, the primary coil having a first end configured to receive the first DC voltage signal, and a second end coupled to the virtual ground through the transistor, the switch control circuit being configured to turn the transistor on and off alternately when the first control signal is set to the active state and to turn the transistor off when the first control signal is set to the inactive state.

12. The power supply control circuit of claim 11, wherein the power drawing circuit is further coupled to the virtual ground and is configured to draw the power from the virtual ground.

13. The power supply control circuit of claim 12, wherein the power drawing circuit further includes a fourth drawing circuit, the fourth drawing circuit including a first capacitor, a second capacitor, a first diode and a second diode, the first diode having an anode coupled to the virtual ground through the first capacitor and a cathode coupled to the power storage circuit, the second diode having an anode that is grounded, and a cathode coupled to the anode of the first diode, the second capacitor being coupled to the second diode in parallel.

14. The power supply control circuit of claim 7, further comprising a standby indication circuit coupled to the power supply main circuit and configured to receive the third DC voltage signal and to generate an indication signal in response to the third DC voltage signal, the power drawing circuit being further coupled to the standby indication circuit and configured to output a power to the standby indication circuit.

15. The power supply control circuit of claim 4, further comprising a relay coupled between the rectify-and-filter circuit and the power source, the standby control circuit being further coupled to the relay and configured to turn on the relay when the first control signal is set to the active state and to turn off the relay when the first control signal is set to the inactive state.

16. A power supply control method to be implemented by using a power supply control circuit that includes a standby control circuit, a microprocessor, and a power supply circuit, the standby control circuit comprising a switch member and an electronic switch, the power supply control method comprising:
enabling the standby control circuit to generate a pulse signal upon actuation of the switch member, to output the pulse signal to the microprocessor and a first control signal to the power supply control circuit, and to set the first control signal to an active state upon actuation of the switch member;
enabling the power supply main circuit to output a power to the microprocessor when the first control signal is set to the active state;
enabling the microprocessor to output a second control signal to the standby control circuit and to set the second control signal to a first state upon generation of the pulse signal; and
maintaining the electronic switch in the activated state when the second control signal is set to the first state to maintain the first control signal at the active state;
enabling the standby control circuit to generate a second pulse signal upon reactuation of the switch member and to output the second pulse signal to the microprocessor;
enabling the microprocessor to set the second control signal to a second state upon generation of the second pulse signal;
deactivating the electronic switch when the second control signal is set to the second state to set the first control signal to an inactive state; and
enabling the power supply main circuit to cut off the power to the microprocessor when the first control signal is set to the inactive state.

17. The power supply control method of claim 16, further comprising:
enabling a standby detection circuit to output a third control signal to the standby control circuit and the microprocessor and to set the third control signal to an standby state when an external load circuit coupled to the standby detection circuit is in a standby mode; and
enabling the microprocessor to set the second control signal to the second state when the third control signal is set to the standby state.

18. The power supply control method of claim 17, further comprising the steps of:
enabling the standby detection circuit to set the third control signal to an operation state when the load circuit is in an operation mode;
enabling the standby control circuit to set the first control signal to the active state when the third control signal is set to the operation state; and
enabling the microprocessor to set the second control signal to the first state when the third control signal is set to the operation state.

19. A power supply control circuit, comprising:
a switch member configured to generate a pulse signal upon actuation of the switch member;
a microprocessor configured to receive the pulse signal for generating a second control signal and, to set the second control signal to a first state upon a first generation of the pulse signal, and to set the second control signal to a second state upon a second generation of the pulse signal,
an electronic switch configured to be activated upon actuation of the switch member, to be maintained in the activated state when the second control signal is set to the first state, and to be deactivated when the second control signal is set to the second state;
an inverter coupled to the electronic switch and configured to output a first control signal, the inverter configured to set the first control signal to the active state when the electronic switch is activated, and to set the first control signal to the inactive state when the electronic switch is deactivated; and
a power supply main circuit coupled to the microprocessor and the standby control circuit and configured to receive the first control signal, to output a power to the microprocessor when the first control signal is set to the active state, and to cut off the power to the microprocessor when the first control signal is set to the inactive state.

* * * * *